United States Patent Office 3,480,436
Patented Nov. 25, 1969

3,480,436
ANTIHALATION COMPOSITIONS CONTAINING PENTAMETHINE OXONOL DYES IN AROMATIC ALCOHOLS
Burton D. Wilson, Rochester, N.Y., assignor to Eastman Kodak Company, Rochester, N.Y., a corporation of New Jersey
No Drawing. Filed Aug. 29, 1966, Ser. No. 575,504
Int. Cl. G03c 1/84
U.S. Cl. 96—84                 6 Claims

ABSTRACT OF THE DISCLOSURE

Novel compositions are provided comprising a hydrophilic colloid having dispersed therein a solution of a pentamethine oxonol dye in an aromatic alcohol, said dye containing two nuclei, each of said nuclei being a 1,3-dialkyl substituted thiobarbituric acid nucleus attached, by the respective 5-carbon atoms thereof, to the terminal carbon atoms of the pentamethine chain. Photographic elements having antihalation layers comprising such compositions are also provided.

---

This invention relates to dispersions of certain oxonol dyes, and to photographic antihalation layers featuring such dye dispersions.

Antihalation layers are well known in the photographic art. To be effective, antihalation layers must absorb the longest radiation to which the emulsion is sensitive. See Baines, "The Science of Photography," 1958, page 85. Previously in order to provide adequate absorption, two, three or usually an even larger number of dyes have been incorporated in antihalation layers. It would be highly desirable to provide antihalation layers featuring one dye which effectively absorbs all radiation to which the emulsion is sensitive.

One object of this invention is to provide novel dye dispersions. Another object of this invention is to provide novel dispersions of certain oxonol dyes in hydrophilic colloids. A further object of this invention is to provide films having an ortho- or panchromatically sensitized photographic silver halide emulsion layer and an antihalation layer featuring a dispersion of at least one dye which absorbs substantially all radiation to which the emulsion is sensitive. Other objects of this invention will be apparent from the disclosure herein and the appended claims.

In one embodiment of this invention hydrophilic colloids are provided which have dispersed therein a solution of certain oxonol dyes, described more fully below, in an aromatic alcohol. It has been found that such dispersions are highly useful as antihalation coatings for photographic elements.

In another embodiment of this invention, photographic elements are provided which feature an antihalation coating comprising a hydrophilic colloid containing a dispersion of certain oxonol dyes dissolved in aromatic alcohol. Such antihalation coatings are highly effective. Only one dye is required to absorb all the radiation to which ortho- or panchromatically emulsions are sensitized.

The oxonol dyes employed in this invention are the polymethine oxonol dyes which contain a pentamethine oxonol dye containing two nuclei, each of said nuclei being a 1,3-dialkyl substituted thiobarbituric acid nucleus attached, by the respective 5-carbon atoms thereof, to the terminal carbon atoms of the pentamethine chain. A highly useful class of such dyes include oxonol dyes having the following general formula:

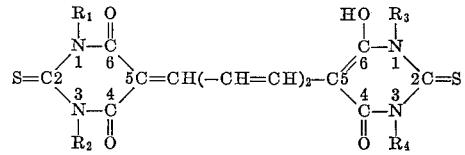

wherein $R_1$, $R_2$, $R_3$ and $R_4$ each represents an alkyl substituent (which may be substituted), preferably containing from 1 to 4 carbon atoms, such as methyl, ethyl, propyl, isopropyl, n-butyl and isobutyl. These dyes normally absorb radiation in the green and red regions of the spectrum. When dispersed in accordance with the invention using an aromatic alcohol solvent, the absorption of such dyes is extended into the blue region. This is quite unexpected, since closely related dyes fail to show a similar shift in absorption when dissolved in an aromatic alcohol and dispersed in a hydrophilic colloid. Further, the dyes of this invention, when dispersed in conventional solvents which are not aromatic alcohols, fail to exhibit the desired shift in absorption.

As noted above, the dyes employed in this invention are dissolved in an aromatic alcohol. Advantageously, the aromatic alcohol is mono-aromatic and contains a hydroxyalkyl group. The hydroxyalkyl group can be substituted, and can contain up to 8 carbon atoms. Preferred aromatic alcohols used herein are phenylhydroxyalkyl alcohols, wherein the hydroxyalkyl groups contains from 1 to 4 carbon atoms, for example, hydroxymethyl, β-hydroxyethyl, γ-hydroxypropyl and γ- or δ-hydroxybutyl. The aromatic alcohol may, of course, contain other substituents such as alkyl, methoxy, halogen and so forth. Some typical useful aromatic alcohols are benzyl alcohol, xylyl alcohol, β-phenylethyl alcohol, tolyl alcohol, trimethylphenyl carbinol p-isopropyl benzyl alcohol, phenylene dicarbinol, mellityl alcohol and anis alcohol.

The solutions of oxonol dye in aromatic alcohol may be dispersed in a wide variety of hydrophilic colloids. A wetting agent may be used to facilitate forming the dispersion. Typical useful hydrophilic colloids include polyvinyl alcohol or a hydrolyzed polyvinyl acetate as described in Lowe U.S. Patent 2,286,215, issued June 16, 1942; a far hydrolyzed cellulose ester such as cellulose acetate hydrolyzed to an acetyl content of 19–26% as described in U.S. Patent 2,327,808 of Lowe and Clark, issued Aug. 24, 1943; a water-soluble ethanolamine cellulose acetate as described in Yutzy U.S. Patent 2,322,085, issued June 15, 1943; a polyacrylamide having a combined acrylamide content of 30–60% and a specific viccosity of 0.25–1.5 or an imidized polyacrylamide of like acrylamide content and viscosity as described in Lowe, Minsk and Kenyon U.S. Patent 2,541,474, issued Feb. 13, 1951; zein as described in Lowe U.S. Patent 2,563,791, issued Aug. 7, 1951; a vinyl alcohol polymer containing urethane carboxylic acid groups of the type described in Unruh and Smith U.S. Patent 2,768,154, issued Oct. 23, 1956; or a polymeric material which results from polymerizing a protein or a saturated acylated protein with a monomer having a vinyl group as described in U.S. Patent 2,852,382, of Illingsworth, Dann and Gates, issued Sept. 16, 1958. The preferred hydrophilic colloid is gelatin.

The dispersions of oxonol dyes in hydrophilic colloid in accordance with the invention are useful antihalation coatings for photographic elements. Such photographic elements include those having a silver halide emulsion which is just sensitive to blue radiation, or which is ortho-or panchromatically sensitized, and coated on a support. The antihalation coatings are most useful when transparent supports are employed and are preferably coated on the side of the support opposite to the silver halide emulsion coatings. However, the antihalation layer can be coated between the support and the emulsion layer or layers, or, even over the emulsion in certain special applications using low dye concentration. Typical transparent supports which are commonly used in the art include polyesters, such as polyethylene terephthalate; polycarbonate films; films composed of cellulose esters, such as celulose acetate or cellulose acetate butyrate; or polyolefins such as polyethylene and polypropylene.

In accordance with the invention, the dyes are incorporated in antihalation layers in concentrations effective to absorb substantially all radiation to which the emulsion is sensitive. Effective concentration may be varied within wide ranges to produce the desired results. A typical useful range is .05 to 100 mg. per square foot.

This invention will be further illustrated by the following example.

EXAMPLE 1

Bis[1,3-diethyl-2-thiobarbituric acid-(5)-]pentamethine oxonol (75 mg.) is dissolved in 25 ml. benzyl alcohol. The solution is then added slowly with mechanical agitation to a mixture composed of 60 ml. of 10 percent aqueous gelatin solution, 40 ml. of water and 2 ml. of 13.1 percent aqueous solution of wetting agent (Alkanol B). The dispersion was then coated on a transparent support. The coating absorbed substantially all radiation to which panchromatically sensitized emulsions are sensitive. The coating showed maximum absorption peaks at 650 m$\mu$ and 475 m$\mu$. When the procedure of this example was followed except that metanol was substituted for benzyl alcohol, the absorption peaks of the coating were at 650 m$\mu$ and 540 m$\mu$. This coating was not an effective antihalation layer, since it failed to absorb blue radiation.

The highly unexpected nature of this invention becomes apparent when it is considered that dyes closely related to the dyes employed herein do not show a shift in absorption towards the blue region of the spectrum when dissolved in aromatic solvent such as benzyl alcohol. Thus, when the procedure of Example 1 was repeated (but substituting the following dyes for the dye used in Example 1) the following dyes were found lacking in absorption of blue radiation:

bis[thiobarbituric acid-(5)-]pentamethine oxonol
bis[thiobarbituric acid-(5)-]trimethine oxonol
bis[thiobarbituric acid-(5)-]methine oxonol
bis[1-ethyl-3-phenyl-barbituric acid-(5)-]pentamethine oxonol
[3-carbethoxymethyl-4-(5(4)-isoxazolone)] [1,3-diethyl-2-thio-5-barbituric acid]pentamethine oxonol
[1,3-diethylthio-barbituric acid-(5)-][3-methyl-1-phenyl-5-pyrazoline-(4)]pentamethine oxonol Antihalation coatings of the invention are useful in photographic elements having one or a plurality of photographic silver halide emulsion layers, and in photographic elements useful in providing colored images.

The invention has been described in detail with particular reference to preferred embodiments thereof, but, it will be understood that variations and modifications can be effected within the spirit and scope of the invention described hereinabove and in the appended claims.

I claim:

1. A composition of matter comprising a hydrophilic colloid having dispersed therein a solution of a pentamethine oxonol dye in an aromatic alcohol, said dye containing two nuclei, each of said nuclei being a 1,3-dialkyl substituted thiobarbituric acid nucleus attached, by the respective 5-carbon atoms thereof, to the terminal carbon atoms of the pentamethine chain.

2. A composition of matter in accordance with claim 1 wherein said hydrophilic colloid is gelatin, and said aromatic alcohol is mono-aromatic and has a hydroxyalkyl substituent containing from 1 to 4 carbon atoms.

3. A composition of matter in accordance with claim 1 wherein said hydrophilic colloid is gelatin; said dye is bis [1,3-diethyl-2-thiobarbituric acid-(5)-] pentamethine oxonol; and, said aromatic alcohol is mono aromatic and has a hydroxyalkyl substituent containing from 1 to 4 carbon atoms.

4. A photographic element comprising at least one photographic silver halide emulsion coated on one side of transparent support, and having on the opposite side of the support an antihalation layer comprising a hydrophilic colloid having dispersed therein a solution of a pentamethine oxonol dye in an aromatic alcohol, said dye containing two nuclei, each of said nuclei being a 1,3-dialkyl substituted thiobarbituric acid nucleus attached, by the respective 5-carbon atoms thereof, to the terminal carbon atoms of the pentamethine chain.

5. A photographic element in accordance with claim 4 wherein the silver halide emulsion is panchromatically sensitized.

6. A photographic element in accordance with claim 5 wherein said oxonol dye is bis[1,3-diethyl-2-thiobarbituric acid-1(5)-]pentamethine oxonol, and said alcohol is benzyl alcohol.

References Cited

UNITED STATES PATENTS

| 2,322,027 | 6/1943 | Jelly et al. | 96—97 |
| 3,247,127 | 4/1966 | Bailey | 96—84 |

NORMAN G. TORCHIN, Primary Examiner

J. R. HIGHTOWER, Assistant Examiner

U.S. Cl. X.R.

252—300